3 Sheets—Sheet 1.

A. C. HOBBS,

Assignor to THE UNION METALLIC CARTRIDGE CO.

Machine for Drawing Cartridge Shells.

No. 9,594. Reissued March 1, 1881.

Witnesses:

Geo. W. Miatt

Joseph L. Levy

Inventor:

Alfred C. Hobbs,

By his Attorney,

Henry L. Brewood

A. C. HOBBS,

Assignor to THE UNION METALLIC CARTRIDGE CO.

Machine for Drawing Cartridge Shells.

No. 9,594. Reissued March 1, 1881.

Witnesses:

Geo. W. Miatt

Joseph L. Levy.

Inventor:

Alfred C. Hobbs,

By his Attorney,

Henry L. Brewood

A. C. HOBBS,

Assignor to THE UNION METALLIC CARTRIDGE CO.

Machine for Drawing Cartridge Shells.

No. 9,594. Reissued March 1, 1881.

Witnesses:

Geo. W. Miatt

Joseph L. Levy

Inventor:

Alfred C. Hobbs,

By his Attorney,

Henry L. Brewer

UNITED STATES PATENT OFFICE.

ALFRED C. HOBBS, OF BRIDGEPORT, CONNECTICUT, ASSIGNOR TO UNION METALIC CARTRIDGE COMPANY, OF SAME PLACE.

MACHINE FOR DRAWING CARTRIDGE-SHELLS.

SPECIFICATION forming part of Reissued Letters Patent No. 9,594, dated March 1, 1881.

Original No. 228,197, dated June 1, 1880. Application for reissue filed November 24, 1880.

*To all whom it may concern:*

Be it known that I, ALFRED C. HOBBS, of the city of Bridgeport, county of Fairfield, State of Connecticut, have made a new and useful Improvement in Machines for Drawing Cartridge-Shells; and I do hereby declare that the following specification, when taken in connection with the drawings attached hereto, gives such a full, clear, and exact description of my invention as will enable other skilled in the art to which it appertains to make use of the same.

Figure 1:
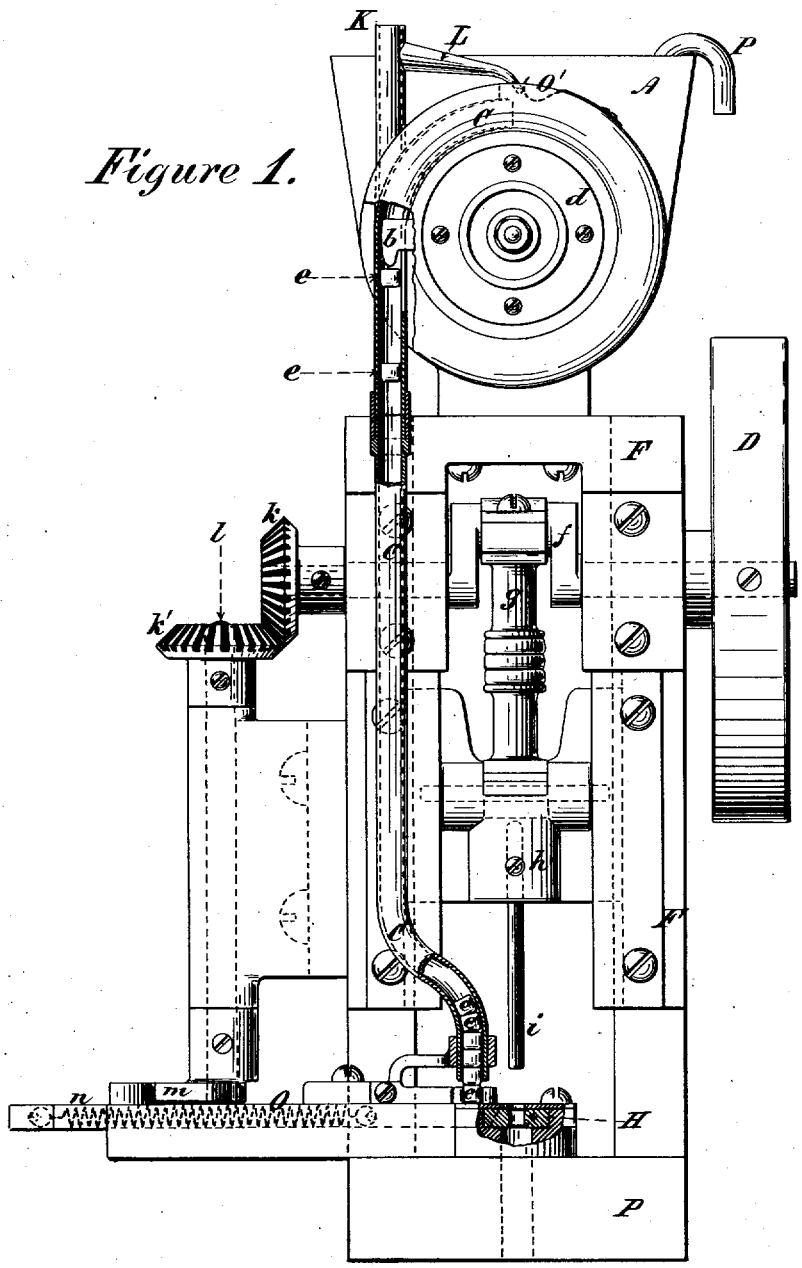
Figure 2:
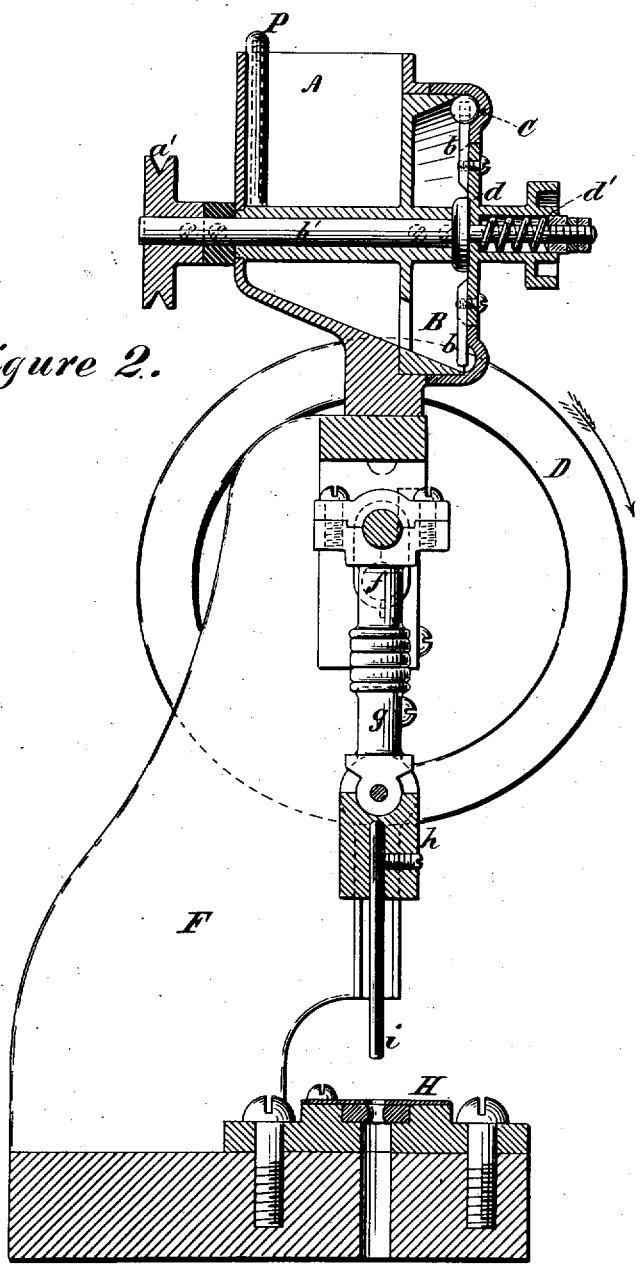
Figure 3:
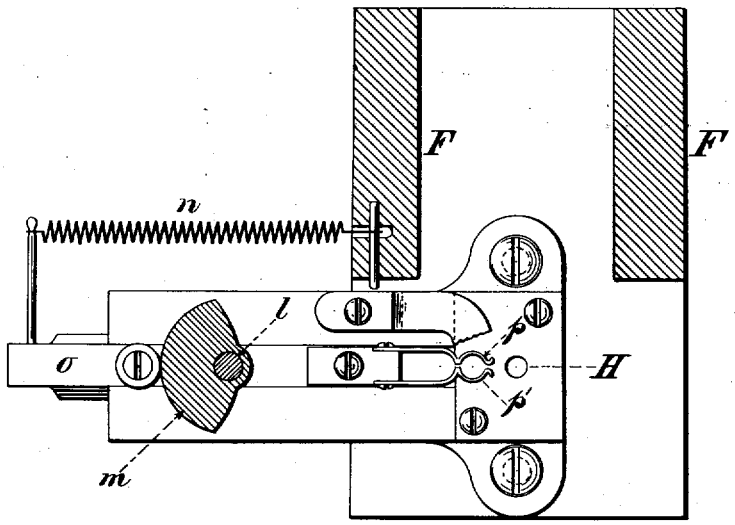

Referring to the drawings, Figure 1 shows a front view of a machine embodying my improvement, partly in section; Fig. 2, a vertical cross-section thereof through the dies; Fig. 3, a horizontal cross-section thereof made just above the dies.

Like letters in the various figures refer to like parts.

My invention relates to an improvement in machines for drawing cartridge-shells or other cup-like articles formed of metal and brought into shape by being drawn through dies.

In the ordinary process of drawing cartridge-shells or other cup-shape articles various machines are used for the purpose of producing the depth of cup required. For example, the flat blank is first passed through one machine, and a shallow cup of large diameter is thus produced. This cup is then passed through another machine, which reduces the diameter of the cup-shape article and increases its length, and so on through a series of similar machines provided with dies and punches of varying sizes until the desired configuration is given to the article thus drawn. Between the various drawing operations the shells or other articles are annealed, so that they may "draw" more readily, and when the articles are subjected to the drawing operation it is found advantageous to have them well moistened with soap-suds or some other equivalent lubricating material. It has been found that the best method of lubricating these shells, or other cup-shaped articles to be drawn, is to wet them with soap-suds or other lubricating material while they are in a mass. When so lubricated great difficulty exists in feeding the shells or other articles with certainty from the hopper in which, in my method of drawing, they are placed with the soap-suds, down through the conducting-tube to the die and punch. It is the purpose of this invention to obviate this difficulty.

Referring to the drawings, A shows the hopper into which the shells or other articles are thrown, and from which they move down the incline plane at the bottom of the hopper into the space B, from which they are taken by the hook-shaped arms *b b*, and by means of which hook-shaped revolving arms they are deposited within the curved slotted transfer-tube C, with their closed ends forward or downward. The hooked arms *b b* form part of or are attached to a revolving plate, *d*. It is unnecessary for me to describe at any great length this feeding mechanism, as it is fully described in the patent to A. I. French, dated December 22, 1868, No. 85,224. The cartridge-shells to be drawn, after having been deposited by the arms *b b* in the curved slotted portion of the transfer-tube C, drop downward in this tube, as shown at *e e*, Fig. 1.

My invention does not relate to the construction of the drawing mechanism, and it will be obvious to any one that my system of feeding the cartridges or other cup-shaped articles may be used in connection with various kinds of machines or devices which require to be supplied with blanks through a transfer-tube. I will, however, briefly describe the various parts of a drawing mechanism with which I have combined it.

At D a fly-wheel is shown, which may be driven by hand or steam power. This wheel is attached to a shaft journaled in the frame F of the machine. This shaft, at its center, is provided with a crank, *f*, which crank, as it revolves, operates the connecting-rod *g* and cross-head *h*, and causes the punch *i* to be reciprocated upward and downward.

At H is shown the die through which the article to be drawn is forced.

The shaft of the wheel D carries at one end a miter-wheel, *k*, which gears into a like wheel, *k'*, attached to a shaft, *l*, supported in the suitable bearings, and which shaft, at its lower extremity, is provided with a cam, *m*. This cam *m* operates in connection with a spring,

*n*, and a sliding piece, *o*, which carries at its front jaws *p* and *p'*. When the machine is in operation these spring-jaws slide backward under the lower end of the transfer-tube C, and receive one of the cartridge-shells, or other cup-shaped articles to be drawn, open end up, as shown in Fig. 1 at *e'*. When the slide *o* advances the jaws carry forward the lowermost shell, and hold it over the dies H until the punch *i* descends and performs its function of forcing the shell through the die H, in this way drawing or elongating the shell in the well-known manner.

The principal difficulty which I have found in using machines of this character consists in the sticking of the shells *e e e* in the transfer-tube C after they have been deposited therein by the arms *b b*. The sticking of the shells *e* in the tube C is caused by the sticky and adhesive nature of the lubricating material put into the hopper A with the mass of shells thrown therein. The shells have to fit the tube C with sufficient closeness to prevent them from turning or twisting in the tube and getting jammed therein, which often takes place when the cups or shells being fed are of large diameter and are comparatively shallow. This comparative closeness of fit required between the exterior surface of the shells *e e e* and the interior of the tube C enables the rather thick soap-suds used to act as a sort of glue, holding the shells suspended in the tube, and thereby preventing the regular and successive passage of the shells through the transfer-tube C, making it necessary that a workman should be in close attendance on the machine, to see that it is properly supplied and that it is working up to its full capacity. I have discovered a simple and very inexpensive method of obviating this difficulty, thus enabling the machine to operate regularly, while at the same time the lubricating materials used within the hopper A may be as thick and as adhesive as the requirements of the drawing operation may make necessary.

The tube C has running from its upper part, and preferably from that point where the tube turns, a branch, K, which is connected, preferably, with a flexible rubber pipe, (not shown in the drawings,) through which a blast of air is forced by a blower or other air-forcing device. The effect of this is that when the shells *e* are placed, by the arms *b b*, within the tube, and have been pushed as far through that tube as they can be by said arms, the blast of air coming downward behind them forces them to drop through the transfer-tube C with great rapidity, thus overcoming any tendency the shells may have to stick within the tube C, and insuring a constant and regular supply of shells to the drawing or other mechanism at the lower part of the machine. The blast of air need not be one of great force—say about two (2) pounds to the square inch, or less. The air-inlet pipe K is provided with a branch near its upper part, (lettered L,) through which a portion of the air, either alone or aided by the action of the spring *o'*, serves to prevent more than one shell or cup-shaped article from being carried up and forced into the tube C. The arms *b b* can only carry on their hooked ends a single shell; but sometimes, by reason of the adhesive quality of the soap-suds, another shell will adhere to the one which is being carried by the hooked ends of one of the arms *b* up to the mouth of the tube C. When this happens it is probable that the shells will jam at this place, and to prevent any such difficulty the spring *o'* and the blast of air through the pipe L are added to the machine. The spring *o'* hits the shell as it is brought up on one of the arms *b*, and, by the aid of the blast of air coming through the pipe L, dislodges any shell adhering to the one upon the hooked end of the arm. This matter is of much greater importance than it appears, for it does not alone affect the operation of the feeding device, but it also, in the following manner, affects the operation of the dies: Very often a shell will be properly hooked upon the end of one of the arms *b*, and another shell will adhere, by its closed end, to the closed end of the shell upon the arm *b*, and would thus be liable to be fed downward through the tube C with its closed end uppermost. When a shell so placed arrives at the dies it will produce a jamming at that part of the machine, by reason of its having been presented wrong end up to the dies and punches, and in this way the whole machine may be stopped, and parts of the machine may be broken.

Entering the hopper A is seen a pipe, P, which may be used to admit soap-suds into the hopper A, or which, if desired, can be used for the passage of steam into and among the mass of shells contained in the hopper. The upper end of the hopper is, of course, left open, so that the shells, &c., may be readily and easily fed in in large quantities, when desired.

The pulley *a'* drives the shaft *b'*, and this shaft, in turn, causes the disk *d*, carrying the arms *b*, to revolve; but the connection between the shaft *b'* and the disk *d* is a frictional connection, as is shown at *d'*, and in this way many accidents which would be unavoidable are prevented.

If it is desired, a steam-jet may be used, in place of the air-jet, through the pipes K and L.

Where the arms *b* pass through and into the transfer-pipe C a slot is made in that pipe, so that the arms may enter, and through this slot, as well as through the pipe L, the excess of air forced by the air-forcing mechanism passes.

What I claim, and desire to secure by Letters Patent, is—

1. The combination, substantially as described, of a hopper adapted to receive a mass of cup-shaped articles, a transfer-tube, a feeding device constructed to take up said articles separately from a hopper and deposit them in said tube, and air-blast appliances, all as set forth.

2. In a machine for feeding and drawing cartridge-shells, the combination of a transfer-tube, a device for feeding the shells to said tube, and the drawing-die and punch, with an air-pipe arranged in connection with the transfer-tube, and device for feeding the shells thereto, substantially as set forth.

3. The combination, in a feeding and drawing machine for cartridge-shells, of the transfer-tube, device for feeding the shells thereto, the punch and die, and the air-pipes K and L, arranged in connection with the transfer-tube and the arms of the device for feeding the shells thereto, substantially as herein described.

4. The combination, in a feeding and drawing machine for cartridge-shells, of the transfer-tube, device for feeding the shells thereto, the air-blast pipes K and L, with the spring *o'*, substantially as herein described.

ALFRED C. HOBBS. [L. S.]

Witnesses:
HENRY C. RYLANDS,
J. N. STANDISH, Jr.